Figure 1:
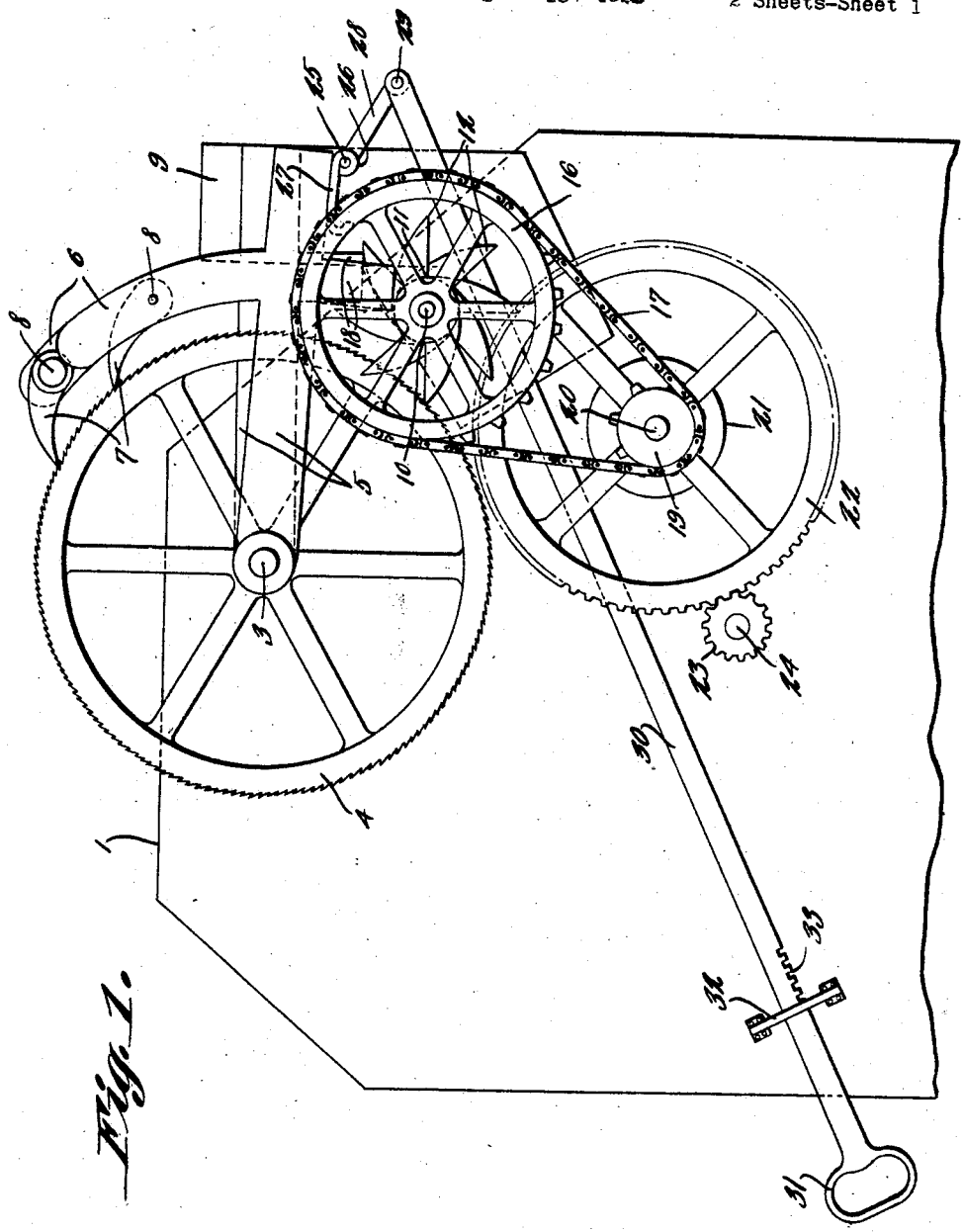

May 25, 1926.

R. E. WILSON 1,586,497

COTTON FEEDER

Filed August 18, 1923

2 Sheets-Sheet 1

Inventor,
R. E. Wilson.
By C. A. Snow & Co.
Attorneys

May 25, 1926.
R. E. WILSON
1,586,497
COTTON FEEDER
Filed August 18, 1923      2 Sheets-Sheet 2
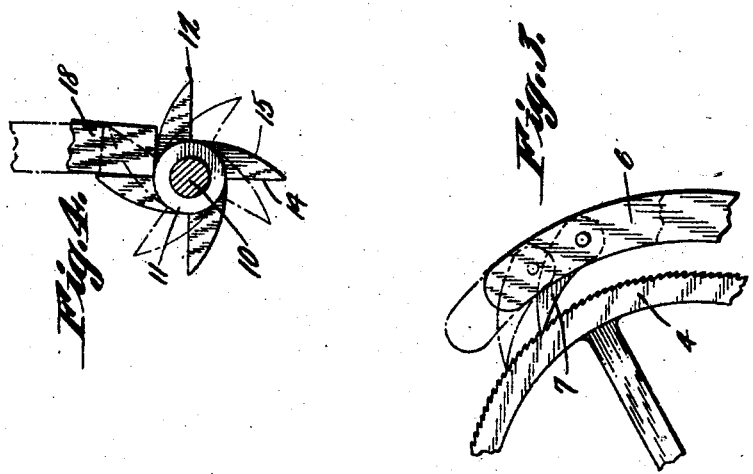
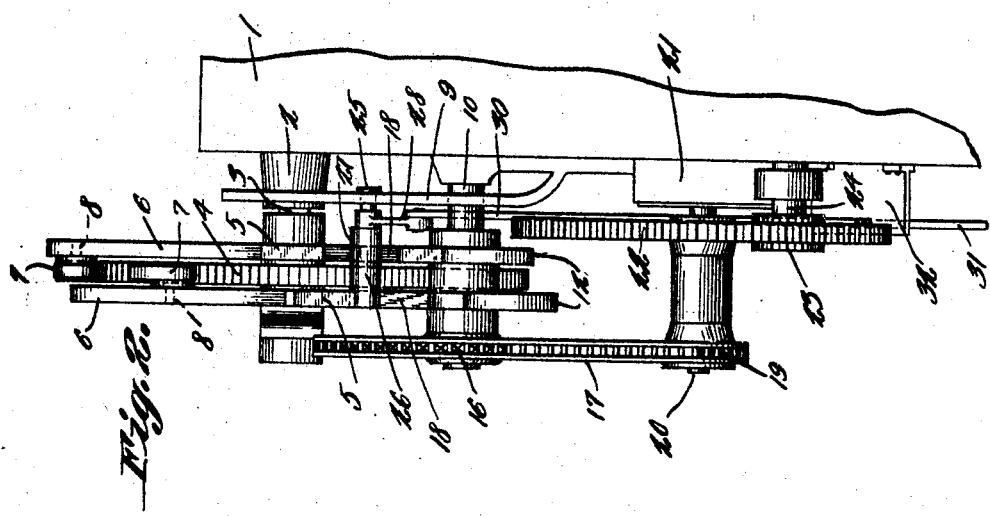
R. E. Wilson,
Inventor.

Patented May 25, 1926.

1,586,497

UNITED STATES PATENT OFFICE.

RALPH E. WILSON, OF DALLAS, TEXAS.

COTTON FEEDER.

Application filed August 18, 1923. Serial No. 658,136.

This invention aims to provide a simple but effective means whereby rotation may be imparted to the feeding shaft of a cotton feeder.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in side elevation, a device constructed in accordance with the invention; Figure 2 is an elevation wherein the structure is viewed at right angles to the showing of Figure 1; Figure 3 is a fragmental elevation showing the cooperation between the pawls and the ratchet wheel; Figure 4 is a fragmental diagrammatic elevation showing the cooperation between the radius arms and the cam wheels.

The numeral 1 marks the frame of a cotton feeder, wherein is journaled at 2 the shaft 3 which operates the feeding mechanism, a ratchet wheel 4 being secured to the shaft 3. Radius arms 5 are located on opposite sides of the ratchet wheel 4 and are mounted to swing on the shaft 3, the radius arms having upwardly extended curved projections 6 whereunto pawls 7 are pivoted at 8, the pawls being adapted to cooperate with the ratchet wheel 4. The projections 6 are located intermediate the ends of the radius arms 5. The radius arms 5 are provided, intermediate their ends, with depending fingers 18. A bearing bracket 9 is carried by the frame 1, the bracket supporting a shaft 10 carrying rotatable cam wheels 11 having teeth 12, the teeth being out of alinement, longitudinally of the shaft 10 as clearly shown in Figure 4. Each tooth 12 includes a radial straight edge 14 and a convexed edge 15. The depending fingers 18 on the radius arms 5 are adapted to cooperate with the respective cam wheels 11, in a way which will be pointed out hereinafter. Any suitable means may be provided for rotating the cam wheels 10. Thus, if preferred, the sprocket wheel 16 may be mounted to move with the cam wheels 11 on the shaft 10, a sprocket chain 17 being engaged about the sprocket wheel 16 and about a sprocket wheel 19 on a shaft 20 supported at 21 on the frame 1, a gear wheel 22 being mounted to move with the sprocket wheel 19, the gear wheel 22 meshing into a pinion 23 on a drive shaft 24 journaled in the frame 1.

A means is provided for limiting the throw of the radius arms 5 and for moving the fingers 18 of the radius arms completely out of engagement with the teeth 12 of the cam wheels 11, to stop the operation of the machine. This means may be of any desired sort. If preferred, a shaft 25 may be mounted in the bracket 9, a sleeve 26 being mounted to rock on the shaft 25, the sleeve carrying a projection 27 extended beneath the outer ends of the radius arms 5. The sleeve 26 has an outwardly projecting arm 28 pivoted at 29 to an operating member 30 in the form of a rod, equipped at its outer end with a handle 31, the operating member being mounted for movement in a keeper 32 carried by the frame 1, the operating member having notches 33 adapted to engage the keeper. The sleeve 26, the projection 27 and the arm 28 may be alluded to as a lever fulcrumed intermediate its ends on the frame 1.

There may be any desired number of cams 11 and as many radius arms 5 as is considered expedient. Although the radius arms 5 are shown in the drawings as being adapted to swing downward by gravity, to cooperate with the cam wheels 11 any suitable means may be provided for bringing the radius arms into engagement with the cam wheels, in the event that the radius arms do not happen to be located as shown in Figure 1 of the drawings.

In practical operation, the pinion 23 is rotated by the shaft 24 and imparts rotation to the shaft 20 by way of the gear wheel 22. The sprocket wheel 19 on the shaft 20 transmits motion to the sprocket wheel 16 through the chain 17, the cam wheels 11 being rotated. The convexed edges 15 of the teeth 12 of the cam wheels 11, cooperating with the fingers 18 on the radius arms 5, cause the radius arms to swing upwardly and downwardly, one radius arm moving upwardly whilst the other radius arm is moving downwardly. In this way, through the instrumentality of the pawls 7, continuous rotation will be imparted to the shaft 3 by way of the ratchet wheel 4. After the convexed edge 15 of the tooth 12 of any cam wheel 11 has operated on the depending finger 18 of the corresponding radius arm 5, the radius arm 5 swings downwardly, the finger 18 moving downwardly along the straight edge 14 of the teeth 12 in a way which will be obvious when Figure 1 of the drawings is noted.

The operating member 30 may be moved endwise, any of the notches 33 being engaged with the keeper 32. When the operating member 30 is moved endwise, rotation is imparted to the sleeve 26 through the instrumentality of the arm 28 and the projection 27 on the sleeve 26 will be raised and lowered at its inner end, thus limiting the vertical travel of the outer ends of the radius arms 5. When the throw of the arms 5 is adjusted as aforesaid, the throw of the pawls 7 will be adjusted accordingly, with a corresponding alteration in the speed of rotation of the ratchet wheel 4 and the shaft 3. If the projection 27 is swung to a sufficient extent, the depending fingers 18 on the radius arms 5 will be lifted entirely out of the travel of the teeth 12 of the cam wheels 11 and, thus, the swinging movement of the radius arms 5 and, consequently the rotation of the ratchet wheel 4 and the shaft 3 will be stopped.

What is claimed is:

In a device of the class described, a shaft, a ratchet wheel on the shaft, a radius arm mounted at one end to swing with the shaft as a center, a pawl mounted on the arm intermediate the ends of the arm and cooperating with the ratchet wheel, a cam supported for rotation and cooperating with the radius arm to impart swinging movement thereto, and means under the control of an operator for limiting the movement of the radius arm and for moving the radius arms out of engagement with the cam, said means embodying a lever fulcrumed intermediate its ends and engaged at one end with the radius arm, an operating member pivoted to the other end of the lever, and mechanism for holding the operating member in adjusted positions.

In testimony that I claim the foregoing as my own, I have hereto affixed my signature.

RALPH E. WILSON.